United States Patent [19]

Murai

[11] Patent Number: 5,239,541
[45] Date of Patent: Aug. 24, 1993

[54] ANTENNA SELECTION DIVERSITY RECEPTION APPARATUS

[75] Inventor: Hideshi Murai, Kanagawa, Japan

[73] Assignee: Mitsubishi Denki Kabushiki Kaisha, Japan

[21] Appl. No.: 647,747

[22] Filed: Jan. 30, 1991

[30] Foreign Application Priority Data

Jan. 31, 1990 [JP] Japan ................................ 2-20675

[51] Int. Cl.[5] .......................... H04J 3/00; H04B 7/08
[52] U.S. Cl. .................... 370/77; 455/277.2; 375/100
[58] Field of Search ............ 370/77, 95.1, 95.3, 370/97; 375/40, 100; 455/52, 133, 134, 277

[56] References Cited

U.S. PATENT DOCUMENTS

| | | | |
|---|---|---|---|
| 4,015,205 | 3/1977 | Ikeda et al. ...................... | 375/100 |
| 4,218,654 | 4/1980 | Ogawa et al. ...................... | 455/52 |
| 4,530,087 | 7/1985 | Yamamoto ...................... | 375/40 |
| 4,864,641 | 9/1989 | Nakamura ...................... | 375/100 |
| 4,977,616 | 12/1990 | Lunder et al. ...................... | 455/277 |

FOREIGN PATENT DOCUMENTS

0124319 11/1984 European Pat. Off. .
0318665 6/1988 European Pat. Off. .
0340912 11/1989 European Pat. Off. .

OTHER PUBLICATIONS

Afrashteh et al., "Performance of a Novel Selection . . . ", IEEE Globcom 1988, pp. 810–814, Nov. 1988.
Akaiwa, "Antenna Selection Diversity . . . ", IEEE Veh. Tech. Conf. pp. 470–473, May 1989.

Primary Examiner—Douglas W. Olms
Assistant Examiner—Hassan Kizou
Attorney, Agent, or Firm—Wolf, Greenfield & Sacks

[57] ABSTRACT

An antenna selection decision system detects the level of the TDM burst immediately preceding to the TDM burst of the user's own channel and decides, on the basis of the detected level, to use the antenna selection diversity method or another selection criterion. When the other selection criterion is selected, the antenna which should receive the next TDM burst of the user's own channel is selected depending on the level of TDM burst of the user's own channel.

8 Claims, 6 Drawing Sheets

ANTENNA SELECTION DIVERSITY RECEPTION APPARATUS

BACKGROUND OF THE INVENTION

1. Field of the Invention

The present invention relates to an antenna selection diversity reception apparatus wherein switching of branches is executed for each time division multiplexing (to be called hereinafter as TDM) burst of digital signals in the digital vehicle communication system.

2. Prior Art

Figure 1:
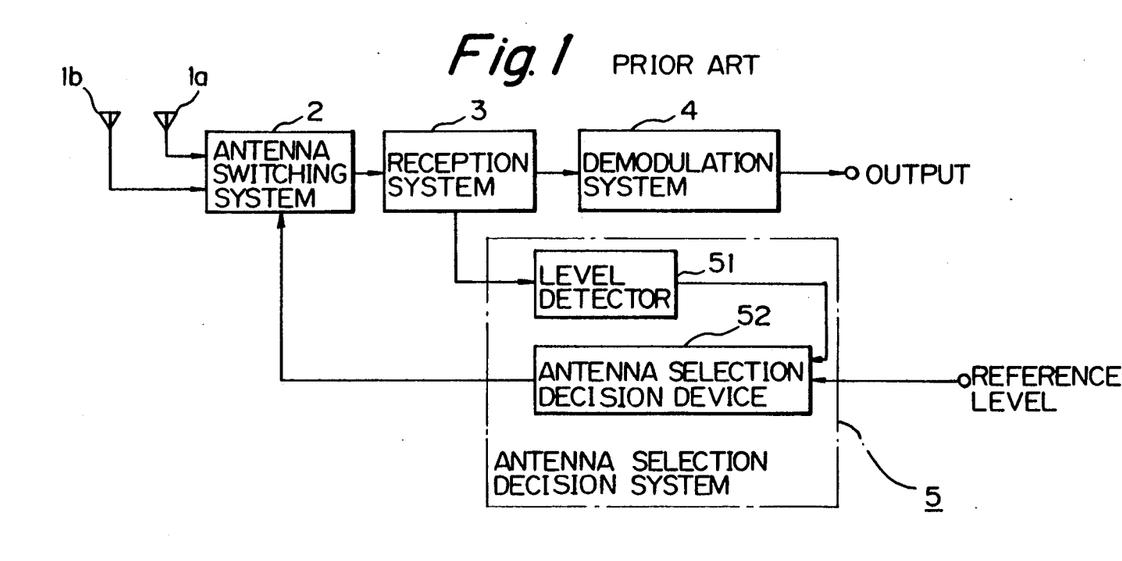
FIG. 1 is a block diagram showing an antenna switching type diversity reception apparatus according to a prior art.

FIG. 1 is a block diagram of the antenna switching diversity reception apparatus according to a prior art as described for example in the literature titled "Mobile Telephone" (compiled by Kuwabara published in 1985 by the Institute of Electronics, Information and Communication Engineers). In FIG. 1, numerals 1a, 1b designate antennas adapted to receive the digital modulation signals in the digital vehicle communication system, and numeral 2 is an antenna switching system for selecting and switching the respective antennas 1a, 1b. Numeral 3 designates a reception system to which the signals received by the antenna 1a or 1b which has been selected by the antenna switching system 2 and in which the signals are subject to high frequency amplification, frequency conversion, intermediate frequency amplification, and so forth. Numeral 4 designates a demodulation system for demodulating the transmission data from the signals output from the reception system 3.

Numeral 5 designates an antenna selection decision system adapted to generate antenna selection signals for controlling the antenna switching system 2 in accordance with the signals from the reception system 3. In the antenna selection decision system 5, numeral 51 designates a level detector adapted to detect the level of the signals which are sent to the demodulation system 4 from the reception system 3, and 52 designates an antenna selection decision device adapted to compare the level detected by the level detector 51 with a reference level which has been provided in advance, so as to generate the antenna selection signals for controlling selection of either of the antennas 1a, 1b and provide these signals to the antenna switching system 2.

Operation of the diversity reception apparatus as described above will be explained. The antennas are switched according to this system when the reception level falls below the reference level. More specifically, in such a case as when the antenna 1a is connected to the reception system 3 by means of the antenna switching system 2, the reception system 3 amplifies at a high frequency the signal received by the antenna 1a, converts this signal to an intermediate frequency signal, amplifies this intermediate frequency signal, and then provides it to the demodulation system 4. The demodulation system 4, in turn, detects the intermediate frequency signal, demodulates the transmission data and outputs this data as output data. The signal which has been output from the reception system 3 is also provided to the antenna selection decision system 5. The antenna selection decision system 5 will detects its level and decides the antenna for reception. Level detector 51 detects the level of the signal provided by reception system 3. The antenna selection decision device 52 is adapted to compare the level of the signal which has been detected by the level detector 51 with the reference level provided in advance for generating the antenna selection signal which is provided to the antenna switching system 2. The antenna switching system 2 is controlled by this antenna selection signal and adapted to select either of the antennas 1a or 1b which has been designated, and to send the resultant reception signal to the reception system 3.

Figure 2A:
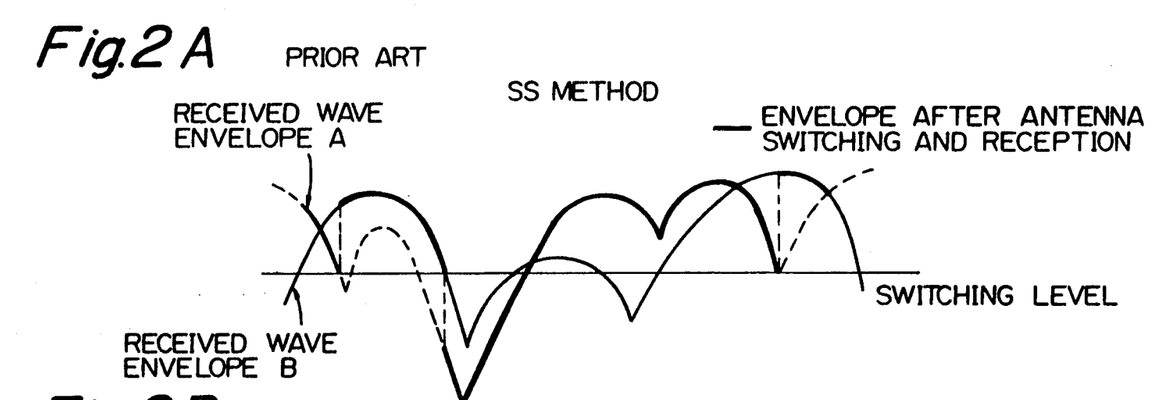
FIG. 2A and FIG. 2B are explanatory drawings respectively illustrating the change in the level of the received wave envelopes of SS method and SE method.
Figure 2B:
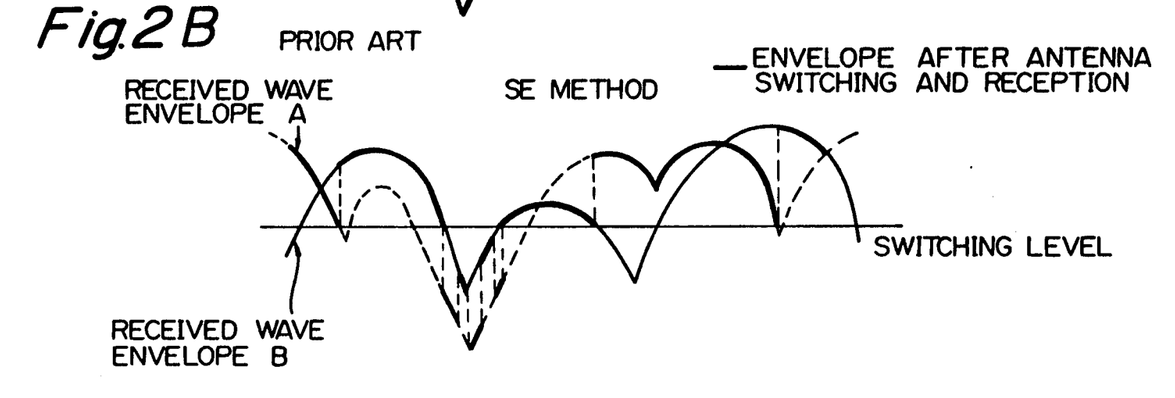

It is to be understood here that there are both a "switch and stay" method (to be called as SS method) and a "switch and examine" method (to be called as SE method) applicable to the antenna switching operation. FIG. 2A and FIG. 2B, show the changes in the received wave envelope levels for each methods mentioned above. As shown in FIG. 2A, the SS method keeps the reception antenna for a certain time even if the level of the signal after the antenna has been switched is lower than the reference level. On the other hand, according to the SE method as shown in FIG. 2B, when the level of the signal after the antenna has been switched is lower than the reference level, the operation of switching the antennas between 1a and 1b is repeated at a predetermined switching rate until the level of the signal received by either of the antenna 1a or 1b reaches greater than the reference level. This is described in detail in such literature as the one titled "Principle of Vehicle Communication" (compiled by Okumura and Shinji, published in 1986 by the Institute of Electronics, Information and Communication Engineers).

Though the above-described methods of antenna switching are suitable for miniaturization and economization of the relevant circuit, they are unsuitable that antenna switching before signal detection causes unavoidable noise arising at the time of switching. In the case of an analog transmission system of frequency modulation (FM) or digital transmission system of frequency division multiple access (FDMA), such reception characteristics as expressed by the envelope level shown by thick solid lines in FIG. 2A and FIG. 2B may be provided as far as this switching noise remains at an acceptable level. However, according to TDM digital transmission system, since communication is conducted in the units of a TDM burst, transmission of TDM burst to be received is finished before operation of the receiver is stabilized for reception when the antenna 1a or 1b is switched in the course of a TDM burst. In view of this problem, there is proposed such a method of receiving one whole TDM burst by using the selected antenna 1a or 1b in such a manner that the antenna 1a or 1b is not switched during reception of a TDM burst, where the level of the signals for the TDM burst allocated to another user immediately preceding user's own burst is detected so as to select the antenna 1a or 1b which has a higher level.

Figure 3:
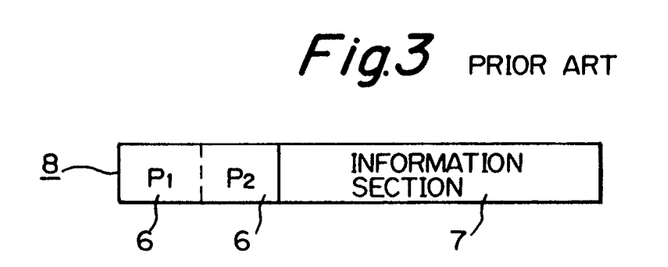
FIG. 3 is an explanatory drawing showing the constitution of the frame to be transmitted to the antenna selection type diversity reception apparatus according to a prior art.

The above-mentioned method which is suitable for TDM transmission method enables the identical antenna 1a or 1b to receive a signal entirely through one TDM burst and is capable of demodulating the signal. In this sense, this method is known as an antenna selection diversity reception method. This sort of antenna selection type diversity reception method is described in detail in such literature as an article titled "Antenna Selection Diversity Reception Method of Digital Vehicle Communication" (authored by Akaiwa, a Collection of Articles in connection with Spring National Session 1989 of the Institute of Electronics, Information and Communication Engineers, Vol. 2, p. 360). According to such an antenna selection diversity reception method, two preamble sections 6 or $P_1$, $P_2$ and an information section 7 are constituted in a frame 8 of a given length as shown in FIG. 3 and thus transmitted. Switching of the antennas 1a, 1b is executed only in the zones of the relevant preamble sections 6. Specifically, according to the example shown in FIG. 3, the level of the signal received by the antenna 1a is measured in the zone $P_1$ in the preamble section 6 while the level of the signal received by the antenna 1b is measured in the zone $P_2$. Thus the receptive levels are compared. As the result, the antenna 1a or 1b which has a higher level is selected and the information section 7 of the frame 8 received by the selected antenna 1a or 1b is provided to the reception system 3 for further reception and demodulation.

Since the conventional antenna selection diversity reception apparatus is constituted as described above, two preamble sections 6, i.e. $P_1$ and $P_2$ having the same function are required in one TDM burst, which inevitably results in a reduction in the efficiency of information transmission. On the other hand, a post detection deversity reception is frequently employed for automobile-installed vehicle communication apparatus. Problems also arise such as the provision of the plural preamble sections 6 having the identical function is not preferable in view of the system constitution only for the antenna selection diversity apparatus which is mainly used for a portable set. In order to solve this problem, it is conceivable to provide such a method wherein measurement of the level of the signals for selecting the antennas is made by measuring the reception level of the immediately preceding TDM burst (the term "the immediately preceding TDM burst" is hereinafter used to mean the TDM burst which has been allocated to another user, such TDM burst immediately preceding TDM burst allocated to present user) by switching the antennas 1a and 1b in specific cycles so as to select the antenna 1a or 1b which has a higher reception level, whereby TDM burst of the user's own channel received by the selected antenna is received and demodulated. However, in the case of the digital mobile communication system, when the transmission power from the base station to the mobile station is restricted in order to reduce interference between the channels which uses the same frequency and overlap each other in some time region in the system, it is possible that the level of the average reception signals of the immediately preceding TDM burst will be very low. In such an instance, the effect of measuring the reception level cannot be expected. When no immediately preceding TDM burst exists due to the existence of a vacant channel, measurement of the level in itself will be impossible due to a lack of transmission from the base station.

SUMMARY OF THE INVENTION

The present invention has been made in order to solve the problems as pointed out above and an object of the present invention is to attain an antenna selection diversity reception apparatus which is capable of adaptively realizing high quality reception characteristics even if there exists no immediately preceding TDM burst or even if measurement of the level of TDM burst is difficult due to the transmission power control at the base station.

This object is achieved by an antenna selection diversity apparatus according to the present invention, characterized in that an antenna selection decision system comprises a level detector for detecting the level of the signal provided from said reception system to said demodulation system, a memory for storing the level detected by said level detector, a computing means for computing the mean values of respective levels which have been stored in said memory, a comparator for comparing the result of the computation effected by said computing means with a numerical value which had been provided in advance and for generating a control signal, and an antenna selection decision means for generating an antenna selection signal which controls selection of said antenna in accordance with the control signal input from said comparator to said antenna selection decision means, to provide said antenna selection signal to said antenna switching system.

The antenna selection decision system according to the present invention detects the level of the immediately preceding TDM burst, and decides to employ whether the antenna selection diversity method or some other selection criterion based on the detected level. In the case that another selection criterion should be selected, the antenna which should receive the next TDM burst of the user's own channel is selected depending on the reception level of the last TDM burst of the user's own channel, whereby the antenna selection diversity reception apparatus having a high quality reception characteristic may be adaptively realized even if there is no immediately preceding TDM burst or the level of such a TDM burst, if it exists, is so low that it is difficult to measure.

These and other objects and advantages will become clear by reading the following description of the invention with reference to the accompanied drawings.

BRIEF DESCRIPTION OF THE DRAWINGS

Through the drawings, same numerals designate the same or similar portions or members.

DETAILED DESCRIPTION OF THE PREFERRED EMBODIMENTS

An embodiment of the present invention will now be explained by referring to the drawings. Firstly in FIG. 4, numerals 1a, 1b designate antennas, numeral 2 an antenna switching system, numeral 3 a reception system, numeral 4 a demodulation system, numeral 5 an antenna selection decision system, numeral 51 a level detector, and numeral 52 an antenna selection decision device which are the same or similar portions to those conventional designated by the same numerals in FIG. 1.

Figure 4:
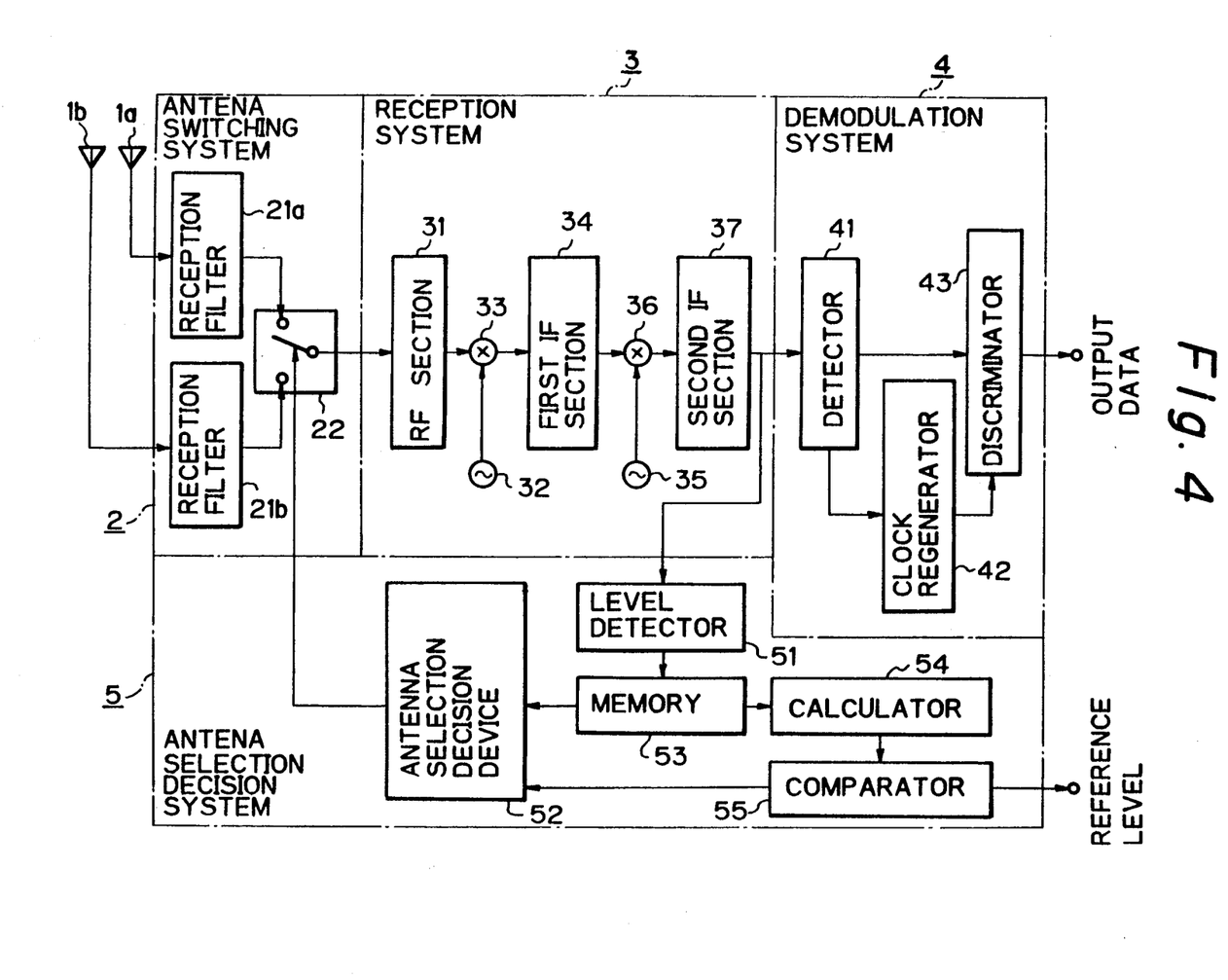
FIG. 4 is a block diagram illustrating an antenna selection diversity reception apparatus according to an embodiment of the present invention.

In the antenna switching system 2, numerals 21a, 21b designate reception filters connected respectively to the antenna 1a or 1b and adapted to remove the undesired component out of the band occupied by the reception signals. Numeral 22 designates an antenna switch which is controlled by the antenna selction signals provided from the antenna selection decision device 52 and adapted to select either of the reception filters 21a, 21b and connect the selected filter 21a or 21b to the reception system 3. In the reception system 3, numeral 31 designates a radio frequency section (to be called hereinafter an RF section) adapted to amplify at a high frequency the signals from either the reception filter 21a or 21b as selected by the antenna switch 22. Numeral 32 designates a first local oscillation section adapted to generate the first local oscillation signal to be mixed with the signal output from the RF section. Numeral 33 designates a mixer adapted to mix the signals. Numeral 34 designates a first intermediate frequency section (to be called hereinafter a first IF section) adapted to selectively amplify the output signal from the mixer 33. Numeral 35 designates a second local oscillator adapted to generate a second local oscillation signal to be mixed with the signal output from the first IF section 34, numeral 36 a mixer adapted to mix these signals and numeral 37 a second IF section adapted to selectively amplify the output signal from said mixer 36.

In the demodulation system 4, numeral 41 designates a detector adapted to detect the signal output from the second IF section 37 and numeral 42 designates a clock regenerator adapted to regenerate a clock signal from the output of the detector 41. Numeral 43 designates a discriminator adapted to sample and decide the output signal of the detector 41 in accordance with the timing of the clock signal regenerated by the clock regenerator 42 so as to demodulate the transmission data and provides it as the output data. In the antenna selection decision system 5, numeral 53 designates a memory adapted to store the level of the signal which is output from the second IF section 37 and detected by the level detector 51. Numeral 54 designates a calculator adapted to calculate the mean level values by averaging the respective levels stored in the memory 53. Numeral 55 designates a comparator adapted to compare the mean level values calculated by the calculator 54 with the reference level which was provided in advance, select the selection criterion selecting signal corresponding to the result of comparison and provide its signal to the antenna selection decision device 52.

The antenna selection decision device 52 is adapted to generate the antenna selection signals for selecting the antenna 1a or 1b in accordance with the criterion selecting signal from the comparator 55 and the content stored in the memory 53. Decision made by the decision device 52 is executed according to a plurality of selection criteria based on the following facts. Namely, if Rayleigh fading exists, the individual detection level is variable. However, the average level may be decided by the mean value of the individual detection level. When the base station controls transmitting power level to the mobile station allocated to the immediately preceding TDM burst so as to be restricted, the mean level value sometimes becomes so faint that it is difficult to estimate the relative fading condition at the antennas 1a, 1b with regard to reception based on the magnitude of the levels. As a consequence, only measurement of the level of the immediately preceding TDM burst is sometimes insufficient as a criterion for making a decision on antenna selection. Accordingly, the next TDM burst of the user's own channel is selected on the basis of reception level near the end of the TDM burst of the user's own channel. In this respect, this antenna selection decision device 52 is different from the conventional one shown in FIG. 1.

Operation of the system shown in FIG. 4 will now be explained. Firstly, in the antenna switching system 2, the reception signals received by the antennas 1a and 1b are passed through the reception filters 21a and 21b to eliminate the undesired component out of the band occupied by the reception signals and are then input to the antenna switch 22. The antenna switch 22 is controlled by the antenna selection signals from the antenna selection decision device 52 and connect the signal received by the antenna 1a or 1b to the reception system 3 according to the antenna selection signal.

In the reception system 3, its signal is fed to RF section 31, subjected to high frequency amplification and fed to the mixer 33. The mixer 33 is adapted to multiply the signal with the first local oscillation signal from the first local oscillator 32, thus mixing them, and then fed the mixed signals to the first IF section 34. In turn, the first IF section selectively amplifies the mixed signal to generate the first intermediate frequency signal and provides it to the mixer 36. The mixer 36 then multiplies the first intermediate frequency signal with the second local oscillation signal from the second local oscillator 35 to mix them and feed thus mixed signals to the second IF section 37. The second IF section 37 is adapted to selectively amplify the mixed signal to produce the second intermediate frequency signal and feed them to both the demodulation system 4 and the antenna selection decision system 5.

In the demodulation system 4, the second intermediate frequency signal from the second IF section 37 is fed to the detector 41 and detected thereby. The detected signal from the detector 41 is input to the clock regenerator 42 and the discriminator 43. The clock regenerator 42 is adapted to regenerate the clock signal from the detected signal and feed the regenerated clock signal to the discriminator 43. The discriminator 43 is adapted to sample and decide the detected signal from the detector 41 in accordance with the timing of the clock signal so as to demodulate the transmission data and provide it as output data.

In the meantime in the antenna selection decision system 5, the second intermediate frequency signal provided from the reception system 3 will be fed to the level detector 51 and the levels which have been detected by measuring the level of the second intermediate frequency signals for a certain period of time will be fed to the memory 53 to be stored therein. The levels to be detected by the level detector 51 are those of the immediately preceding TDM burst of the user's own channel (namely TDM burst allocated to another user) and of the ending portion of TDM burst of the user's own channel for a certain period of time. The levels of the immediately preceding TDM bursts are those levels at which those TDM bursts were received at two antennas 1a and 1b, while the level of TDM burst of the user's own channel is the level of the TDM burst received at the selected antenna. These levels that have been detected may be stored in the memory 53 without intermixing.

It is preferable for the input signal of the level detector 51 to be extracted from the portion which is least affected by the noise. This is because that the less noise affects, the lower probability it becomes to select the antenna having a lower signal level. Accordingly, it is preferable that the signal to be input to the level detector 51 be extracted from the input to the detector. In FIG. 4, there is illustrated a constitution comprising two stages of IF sections, i.e., the first IF section and the second IF section. It is also conceivable to have the constitution comprising only one stage IF section or more than three stages of IF sections. In such cases, the input signal of the level detector is to be extracted from the output from the last IF section connected to the detector. More specifically, the input signal of the level detector will be normally taken out of the last stage output of IF section or input to the detector.

Subsequently, the mean values of the respective levels stored in the memory 53 are calculated at the calculator 54. The mean level values which have been obtained by averaging detected levels of immediately preceding TDM bursts are used for deciding whether the antenna selection criterion may be selected on the basis of the altitude of the levels of the immediately preceding TDM bursts. Since it is only necessary to obtain the mean level values, the averaging operation for this purpose may be carried out with regard to the reception level only at the antenna 1a, or only at the antenna 1b or at both of the antennas 1a, 1b. This operation does not form a part of the invention. An averaging operation can be executed by employing the moving average of the respectively measured levels. The range or width of measurement for obtaining such average values is not specifically defined by the present invention, but the range of measurement which allows a reasonably precise mean level values to be assumed will be good enough.

In this way, the mean level values which have been thus acquired are then compared by the comparator 55 with the reference level which has been provided in advance. If the mean level value is higher than the reference level, the antenna selection diversity as conventional will be executed. If the mean value is lower than the reference level, then the content of the criterion selecting signal will be altered. Although the value of the reference level is not specifically defined by the present invention, a level necessary to achieve the error rate in the order of $10^{-2}$, for example, may be appropriate.

In accordance with the change of criterion selecting signal, the antenna selection decision device 52 alters the criterion of a conventional antenna selection diversity to that one as mentioned below. Namely, if the level measured in respect of the ending part of TDM burst of the user's own channel is larger than the value necessary for satisfying the required error rate, the next TDM burst of the user's own channel is received by the current antenna 1a or 1b. If the measured level is lower than the necessary value, an antenna selection signal is output so that the next TDM burst of the user's own channel is received by the antenna 1b or 1a different from the current antenna. However, while the antenna 1a or 1b is selected in accordance with the criterion as mentioned above, the level of the immediately preceding TDM burst is continuously measured and when the mean level value exceeds the reference level, then the content of the criterion selecting signal from the comparator 55 will be altered such that the conventional antenna selection diversity will be executed in accordance with the selection criterion as the result of comparison of the level of the immediately preceding TDM burst again.

The operation of the antenna selection decision system will be explained in detail in the case where three mobile stations are provided, three channel multiple TDM signals being used, and the own station is assumed to be mobile station 2.

Figure 5:
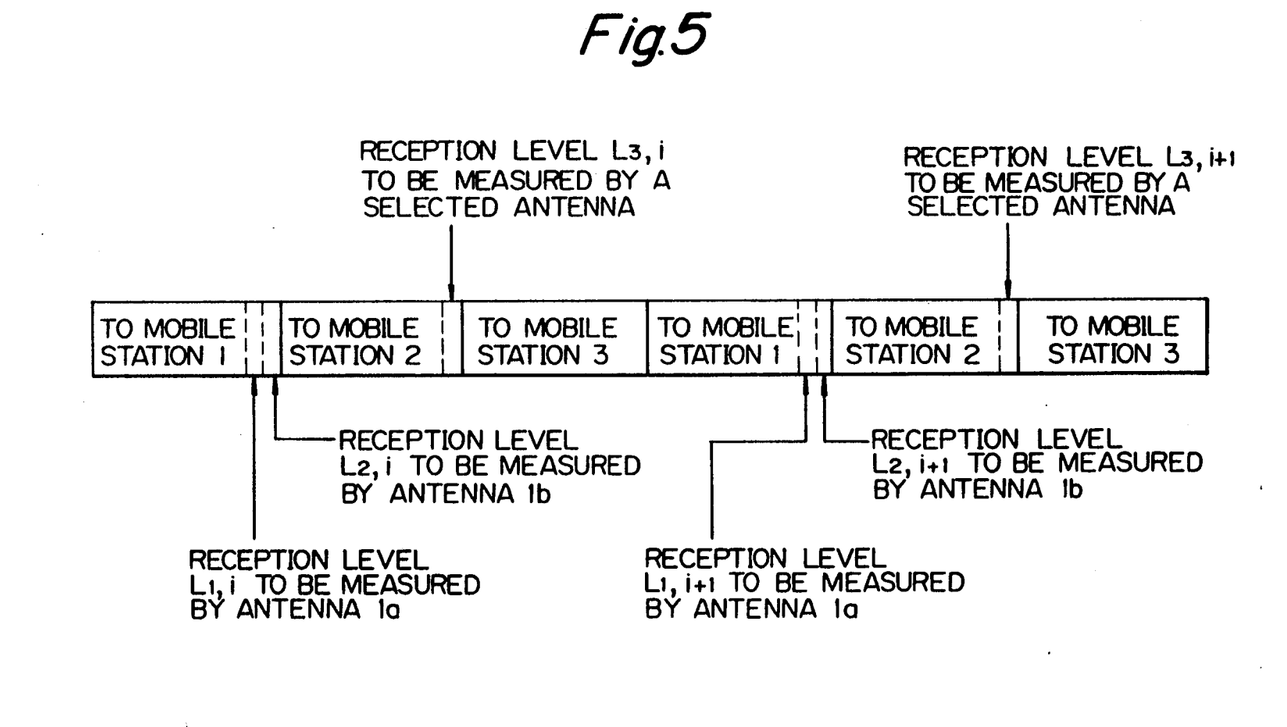
FIG. 5 is a schematic diagram illustrating three channel multiple TDM signals in the case where the user's own station is assumed to be mobile station 2.

FIG. 5 illustrates a stream of three channel multiple TDM signals in the case where the own station is assumed to be mobile station 2. In FIG. 5, respective frames designate in order from left side to right side the i-th TDM bursts of mobile stations 1 to 3 and the following (i+1)-th TDM bursts of mobile stations 1 to 3. Symbols $L_{1,i}$ and $L_{2,i}$ designate respectively the received levels of the signals in the vicinity of ending portion of the i-th TDM burst to be transmitted to the mobile station 1, which is respectively received by the antennas 1a and 1b of the mobile station 2. Symbols $L_{1,i+1}$ and $L_{2,i+1}$ designate respectively the received level of the signals in the vicinity of the ending portion of the (i+1)-th TDM burst to be transmitted to the mobile station 1, which is respectively received by the antennas 1a and 1b of the mobile station 2. Furthermore, symbols $L_{3,i}$ and $L_{3,i+1}$ designate respectively the received levels of the signals in the vicinity of the ending portion of the i-th and (i+1)-th TDM bursts, respectively, to be transmitted to the mobile station 2, that is the user's own station, which are respectively received by the antenna either 1a or 1b which has been selected.

As described hereinbefore, $L_{1,i}$, $L_{2,i}$ and $L_{3,i}$ are detected by the level detector 51, and stored in the memory 53. The mean level value $L_c$ is calculated by the calculator 54 by using the stored reception levels $L_{1,i-1}$-$L_{1,i-N}$ and $L_{2,i-1}$-$L_{2,i-N}$ (where N is integer), for example, in accordance with the following expression:

$$L_c = \frac{1}{2}\left(\frac{1}{N}\sum_{l=1}^{N}L_{1,i-l} + \frac{1}{N}\sum_{l=1}^{N}L_{2,i-l}\right)$$

$$= \frac{1}{2N}\left\{\sum_{l=1}^{N}(L_{1,i-l} + L_{2,i-l})\right\}$$

Figure 6:
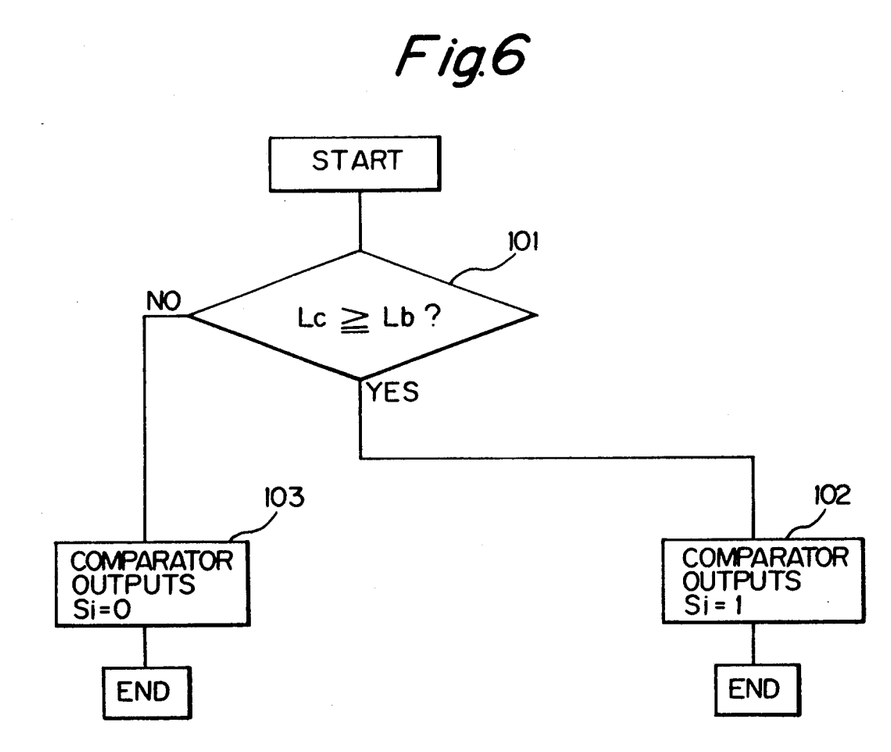
FIGS. 6 and 7 are diagrams respectively illustrating by way of a flow chart, operation of the comparator and the antenna selection decision device adapted to select the antenna which receives the $(i+1)$-th TDM burst.
Figure 7:
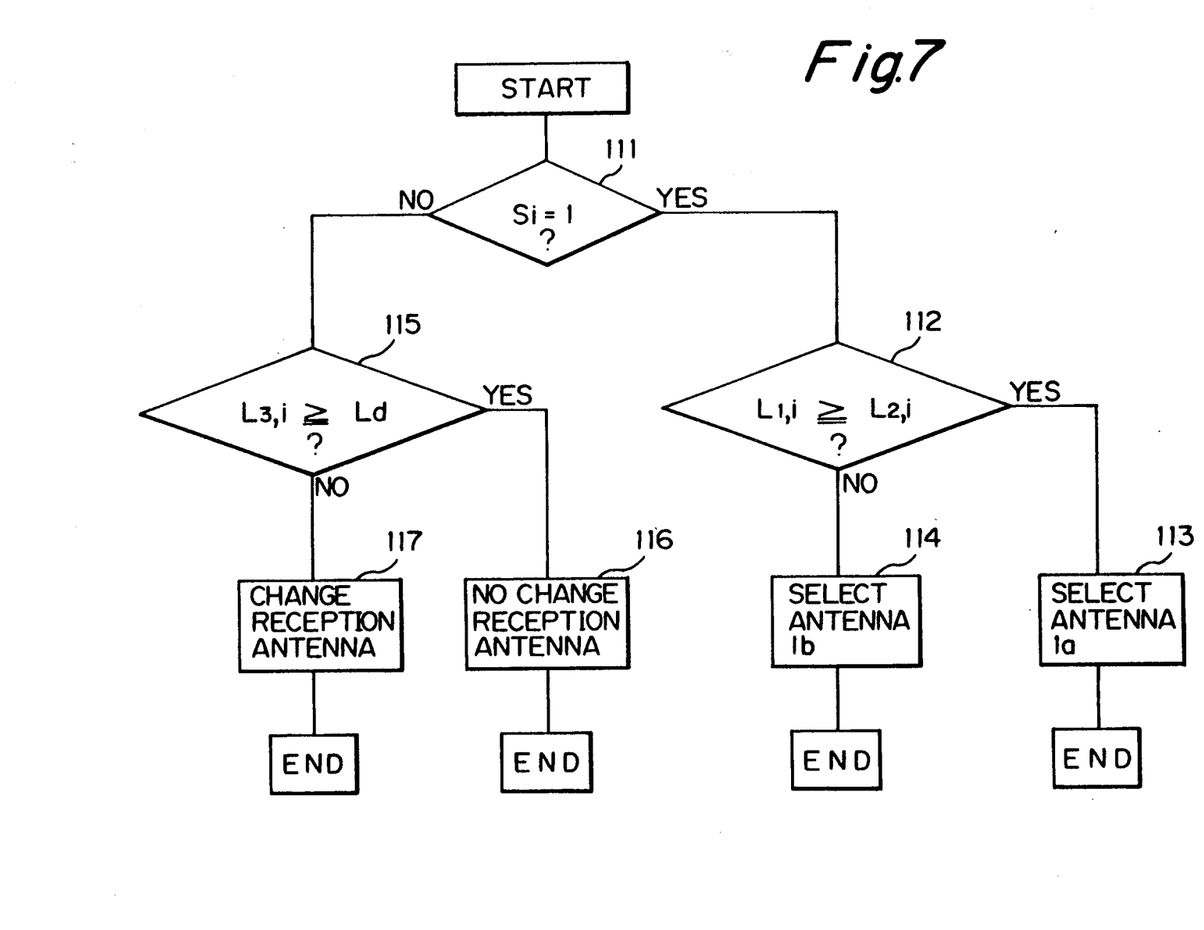

FIG. 6 and FIG. 7 respectively illustrate by way of a flow chart, operation of the comparator and the antenna selection decision device adapted to select the antenna which receives the i-th TDM burst.

Referring to FIG. 6, operation of the comparator 55 will be explained which is adapted to select the antenna which receives the i-th TDM burst. In the decision block 101, the comparator 55 compares the mean level value $L_c$ given by the calculator 54 and the reference level $L_b$ which has been provided to the comparator 55 in advance. When the mean level value $L_c$ is greater than or equal to the reference level $L_b$, the comparator outputs $S_i=1$ in the block 102. On the other hand, if the mean level value $L_c$ is smaller than the reference level $L_b$, the comparator 55 outputs $S_i=0$ in the block 103.

By referring nextly to FIG. 7, operation of the antenna selection decision device 52 for selecting the antenna which receives the i-th TDM burst will be explained. The antenna selection decision device 52 receives the output $S_i$ from the comparator 55 and decides whether the output $S_i$ from the comparator is 1 or not in the decision block 111. When the output $S_i$ from the comparator is decided to be 1, or when the mean level value $L_c$ is larger than or equal to the reference level, the antenna selection decision device 52 compares, in the decision block 112, the level $L_{1,i}$ received by the antenna 1a near the end of the i-th TDM burst transmitted to the mobile station 1 with the reception level $L_{2,i}$ received by the antenna 1b near the end of the i-th TDM burst. If $L_{1,i}$ is larger than or equal to $L_{2,i}$, the antenna selection decision device 52 outputs, in the block 113, the antenna selection signal for selecting the antenna 1a to the antenna switching system 2. Or if $L_{1,i}$ is smaller than $L_{2,i}$, the antenna selection decision device 52 outputs, in the block 114, the antenna selection signal for selecting the antenna 1b to the antenna switching system 2.

On the other hand, if the output $S_i$ from the comparator is decided to be "0" in the decision block 111, the antenna selection decision device 52 compares, in the block 115, the reception level $L_{3,i-1}$ received by the selected antenna near the end of (i-1)-the TDM burst transmitted to mobile station 2 or the user's own station, with the level $L_d$ which has been provided to the antenna selection decision device 52 in advance. The level $L_d$ is the value necessary to satisfy a required error rate. Although the value of the level Ld is not specifically defined by the present invention, it may be appropriate to be selected according to the system condition to be applied. If $L_{3,i-1}$ is larger than or equal to $L_d$, or the level measurement value near the end portion of TDM burst of the user's own channel is larger than a required value for satisfying a required error rate, the antenna selection decision device 52 will not change the reception antenna in the block 116. On the other hand, if $L_{3,i-1}$ is smaller than $L_d$, or the level measurement value near the end portion of TDM burst of the user's own channel is a small value which cannot satisfy the required error rate, the antenna selection decision device 52 outputs the antenna selection signal for changing the reception antenna of $L_{3,i-1}$ to the antenna switching system 2.

It is to be noted that although the situation in which two antennas are used has been explained in the above-described embodiment, similar effects to those of the above embodiment may be provided in the case of three or more antenna being used.

As explained above, the present invention has been so constituted that the mean level values at both antennas are compared with the reference value provided in advance, a specified selection criterion is selected out of plural criteria and the next TDM burst is selected in accordance with the selected criterion. Accordingly, even if the transmission power form the base station is restricted, the criterion may be adaptively altered so as to select the appropriate antenna, so that a diversity effect may be achieved even if the level of the immediately preceding TDM burst is low. The degree of the diversity effect depends on the variation cycle of fading, the moving speed of the mobile equipment, etc., but the fading cycle is a slow one in the case of the mobile equipment for which the antenna selection diversity method is effective. Therefore, when the moving speed is in or under the order of 5-10 km/hr, an antenna selection diversity reception apparatus may be provided for which a certain degree of diversity effect may be expected even if the criterion which uses the reception level of the prior TDM burst of the user's own channel is applied.

The present invention has been described in detail with reference to certain preferred embodiment thereof, but it will be understood that varieties and modifications can be effected within the spirit and scope of the invention.

What is claimed is:

1. Antenna selection diversity reception apparatus for a digital vehicle communication system according to a TDM system in which a TDM frame is divided into a plurality of time slots with TDM bursts allocated to each time slot, each time slot of the frame being assigned to a user to form a communication channel on which the TDM bursts may be received, the apparatus comprising first and second antennas for receiving TDM bursts of digital modulation signals, an antenna switching system for selecting and switching antennas, a reception system for providing the TDM bursts received by the antenna which has been selected by said antenna switching system with high frequency amplification, frequency conversion and intermediate frequency amplification, a demodulation system for demodulating transmission data from the signal output from said reception system, and an antenna selection decision system for generating an antenna selection signal which controls said antenna switching system in accordance with the signal output from said reception system with branch switching being executed in accordance with TDM bursts, having characteristic in that said antenna selection decision system comprises:
   a level detector for detecting the level of the signal provided from said reception system;
   a memory for storing levels from different time slots detected by said level detector;
   a computing means for performing an averaging operation on selected levels which have been stored in said memory;
   a comparator for comparing the result of said averaging operation effected by said computing means with a given value which has been provided in advance and for generating a control signal; and
   an antenna selection decision means for generating an antenna selection signal which controls switching between said first and second antennas in accordance with the control signal from said comparator, to provide said antenna selection signal to said antenna switching system.

2. An antenna selection diversity reception apparatus as claimed in claim 1 wherein said level detector detects the level of the signal which is included in the TDM burst of the channel allocated to the apparatus and received by one of the first or second antenna which has been selected.

3. An antennas selection diversity reception apparatus as claimed in claim 2 wherein said comparator generates a first control signal when the level measured from a user's own channel is equal to or more than a given value, and generates a second control signal when said level is less than said given value.

4. An antenna selection diversity reception apparatus as claimed in claim 3 wherein said antenna selection decision means responds to said first control signal by generating a first antenna selection signal indicating maintaining the current one of said first or second antennas and responds to said second control signal by generating a second antenna selection signal indicating a switch to the other of said first and second antennas.

5. An antenna selection diversity reception apparatus as claimed in claim 1 wherein said computing means computes an average value of levels of the signals in the TDM burst allocated on the time slot immediately preceding the time slot allocated to the apparatus.

6. An antenna selection diversity reception apparatus for a digital vehicle communication system according to TDM method, comprising first and second antennas for receiving TDM bursts of digital modulation signals, and antenna switching means for switching between said first and second antennas, a reception means for receiving the TDM bursts received by the antenna which has been selected by said antenna switching means, and an antenna selection decision system for selecting the antenna to be connected to said reception means in accordance with TDM bursts, having characteristic in that said antenna selection decision system comprises level detecting means for detecting the levels of the signals which are included in the TDM burst of the channel allocated to the apparatus and the immediately preceding TDM burst immediately preceding thereto and are received by said antennas, a memory for storing the levels of signals detected by said level detecting means, and an antenna selection decision means for generating an antenna selection signal on the basis of the levels stored in said memory; said antenna switching means responding to said antenna selection signal to switch between said first and second antennas.

7. An antenna selection diversity reception apparatus as claimed in claim 6 wherein said antenna selection decision system further includes a calculating means for calculating the mean level value of the stored levels; and said antenna selection decision means generates said antennas selection signal based on said mean level value.

8. An antenna selection diversity reception apparatus as claimed in claim 6 wherein said antenna selection decision system further includes
a comparing means for comparing the detected level of the signal included in said immediately preceding TDM burst with a predetermined level; and wherein said antenna selection decision means compares the detected level of the signal included in said TDM burst of the channel allocated to the apparatus and received by the antenna which has been selected, with another predetermined level, when the result obtained from said comparing means is that the detected level of the signal included in said immediately preceding TDM burst is less than said predetermined level, and said antenna selection decision means generating an antenna selection signal indicating a switch to another antenna, when said detected level of the signal in said TDM burst of the channel allocated to the apparatus is less than said another predetermined level.

* * * * *